Jan. 30, 1962 S. A. ZARLENG 3,019,369
POLARITY SWITCHING CIRCUIT
Filed March 31, 1959
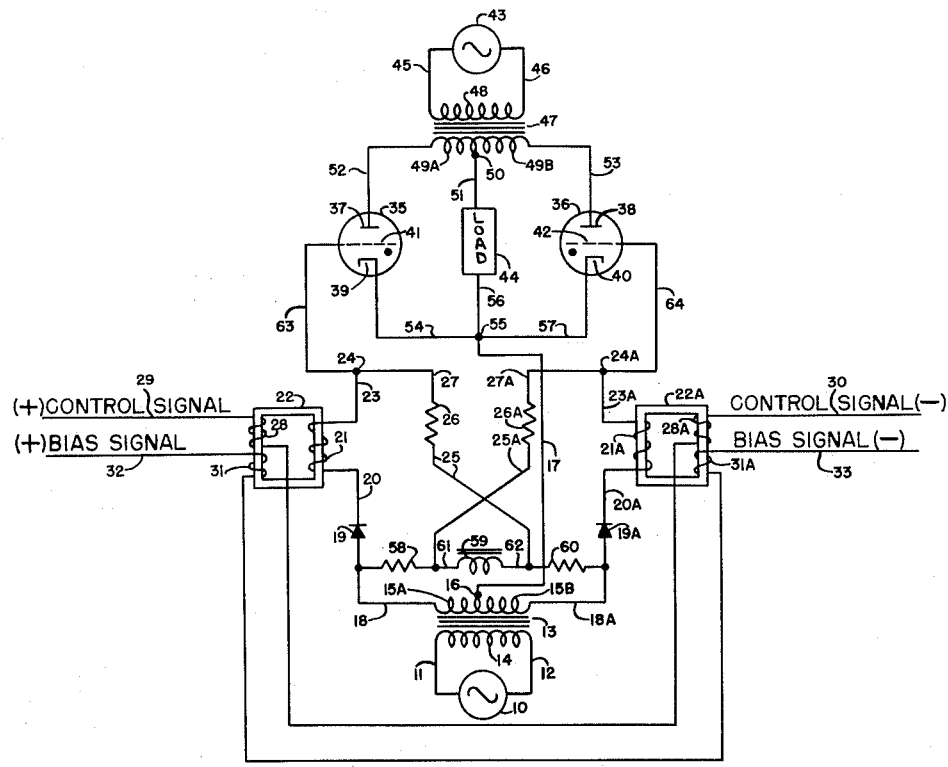
FIG. 2
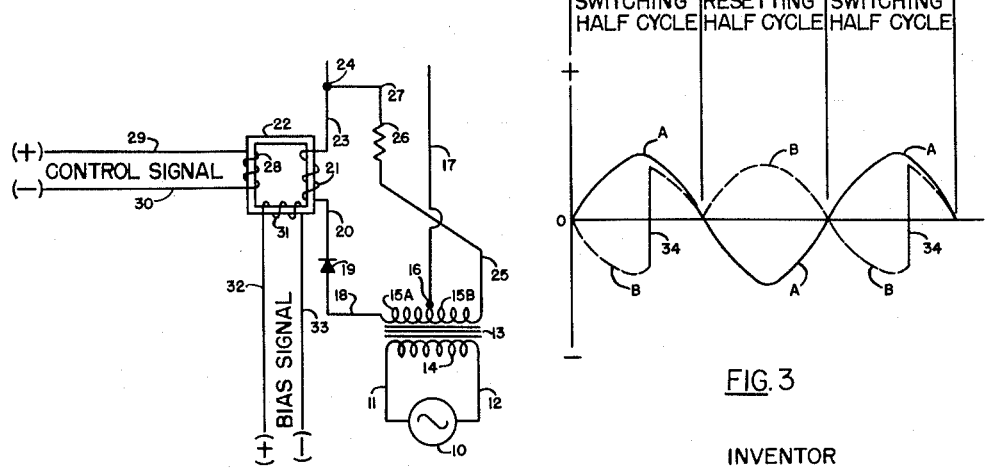
FIG. 1
FIG. 3
INVENTOR
STEVE A. ZARLENG
BY Charles O. Putnam
ATTORNEY United States Patent Office 3,019,369
Patented Jan. 30, 1962

3,019,369
POLARITY SWITCHING CIRCUIT
Steve A. Zarleng, Akron, Ohio, assignor to The Clark Controller Company, Cleveland, Ohio, a corporation of Ohio
Filed Mar. 31, 1959, Ser. No. 803,189
20 Claims. (Cl. 315—205)

My invention relates generally to the reversing of the polarity of an alternating current voltage and more particularly to circuits for precisely controlling the time in the voltage cycle at which the polarity of the alternating current voltage is reversed.

A voltage whose polarity is capable of being reversed, may be used on many varied and different applications; one of the more important uses being the initiating of current conduction in grid controlled rectifiers, such as; gas filled tubes, vacuum tubes, transistors, and the like. In order to describe herein at least one of the more important uses, as required by law, it has been chosen to describe it herein as supplying the control grid voltage for gas filled tubes.

It is well known that the conduction of current through gas filled tubes may be initiated by suitably energizing its control grid and providing the proper plate-cathode voltage is present. Once the current conduction is established, it is not normally extinguished by means of a control grid. One common method of extinguishment is to energize the plate-cathode circuit with an alternating current power source. Since the gas filled tube is a unidirectional conducting device, conventionally from plate to cathode, the current conduction will automatically be extinguished when the voltage appearing on the cathode becomes positive with respect to the voltage appearing on the plate.

By use of this method, the time for the extinguishment of current conduction is automatically established. Therefore, the amount of current conducted by the tube during the half cycle that its plate is positive can be controlled by changing the time at which the tube starts its conduction. This can be readily accomplished by controlling the time in the positive half cycle at which the energizing voltage applied to the control grid fires the tube. The tube will conduct more current when fired earlier in the positive half cycle and thus more current will be supplied to the load.

Heretofore, various other methods have been used to control firing of the tube. One method is to apply an alternating current voltage to the control grid which is substantially out of phase with the voltage on the plate-cathode circuit. The out of phase voltage may be obtained from any time phase shifting system, such as those employing resistors, capacitors, and inductors. The tube will then fire whenever the grid voltage is made more positive that the critical grid voltage in the positive half cycle. This critical grid voltage is ordinarily slightly negative with respect to the cathode voltage. To vary the amount of current conducted by the tube in this half cycle, it is necessary to adjust the phase angle of the voltage applied to the control grid. As the phase angle of the grid voltage is advanced, the tube will progressively increase its time of conduction.

Another method which is commonly used, is to superimpose a pulse upon the bias voltage that is applied to the control grid. This voltage pulse is caused to cross the critical grid voltage sometime in the positive half cycle. The amount of current conducted by the tube can be changed by controlling the time in the half cycle at which the voltage pulse occurs. Pulses can be obtained by the use of various types of saturating magnetic devices. In this method, either a D.C. or A.C. grid bias voltage may be employed.

Still another method that is used, is a combination of the two previously described methods. That is, having a phase shifted voltage with a pulse occurring in it as a fixed predetermined time. The amount of current conducted by the tube can be changed by shifting the phase of the voltage so that the pulse will cross the critical grid voltage at different points in the positive half cycle of the tube.

Some of the above described systems are inherently slow, because of their use of saturable reactors. Others require that a negative bias voltage be applied to the control grid so that the impressed voltage does not cross the critical grid voltage and cause the tube to initiate conduction when not desired. This could be due to a change in the plate-cathode voltage. Also, when the phase shift system is used, the slope of the control grid voltage may be low which could cause loss of effective grid control or erratic firing of the tube under some circumstances.

The present invention is directed towards a circuit for switching the polarity of an alternating current voltage about a reference during one of its half cycles. This half cycle is called a switching half cycle. The instant during a switching half cycle that the change of polarity occurs is varied by a control signal. The control signal causes the circuit to be reset during the other half cycle, which predetermines the instant in the next switching half cycle that the change of polarity will occur. The half cycle during which the circuit is reset, is called the resetting half cycle.

One embodiment of my invention is comprised of a source of alternating curret having a center tap. The center tap serves as the reference about which the polarity of the voltage is reversed. The side of the source that is positive during the switching half cycle, has a unidirectional conducting device and a winding of a reactor connected in series with it. The other side of the source is connected to the remote side of the reactor winding through resistors. It is the voltage polarity occurring at the remote side of the reactor winding that is switched about the center tap polarity during the switching half cycle.

While the reactor is unsaturated during the switching half cycle, its winding assumes a high impedance with respect to the resistors making the polarity at the remote side of the winding substantially the same as that at the other side of the source.

When the reactor is saturated, the impedance of its winding drops to a very low value with respect to the impedance of resistors so that the polarity at the remote side of the winding is switched to substantially the same polarity as that on the first side of the source.

The reactor also has control windings and bias windings wound on it. These windings are energized with unidirectional current so that they have the same effect on the reactor during both the switching and resetting half cycles. By varying the combined effect of the current flowing through these windings, the instant that the reactor saturates in the switching half cycle can be controlled.

It is therefore the primary object of my invention to provide a method of switching the polarity of an alternating current voltage about a reference in the aforedescribed manner.

It is another object of my invention to provide a method of controlling the conduction of grid controlled rectifiers by switching the polarity of the voltage impressed on their control grids.

It is another object of my invention to provide a method of controlling the voltage on a control grid where the control signals themselves may be isolated from the tube circuit and each other.

It is still another object of my invention to provide a method of controlling the voltage on a control grid over the entire conducting range of the tube.

It is a further object of my invention to provide a method of generating a voltage wave form compatible with the requirements of control for control grid tubes, such that no auxiliary voltage source is required.

It is a further object of my invention to provide a circuit for energizing the grid of a grid controlled rectifying device with a negative potential and then switch the potential to a positive polarity to make the device conductive.

The above and other objects of my invention will be made apparent to those skilled in the art when taken in consideration with the following specifications and the accompanying drawings in which:

FIGURE 1 is a schematic representation of the polarity switching circuit.

FIGURE 2 is a schematic representation of one embodiment of my invention as to the controlling of the conduction of gas filled tubes.

FIGURE 3 illustrates the wave forms of the voltages for the circuit of FIGURE 1.

Referring to the drawings by reference numerals, there is shown in FIGURE 1 at 10, a source of alternating current power. Source 10 is connected by wires 11 and 12 to a primary winding 14 of a transformer 13.

Transformer 13 has a secondary winding 15 which is divided into halves, 15A and 15B, by a center tap 16. Center tap 16 serves as the reference about which the voltage polarity is switched. A wire 17 is connected to center tap 16 and serves as an output terminal of the switching circuit.

Half 15A is connected through wire 18, rectifier 19, wire 20, reactor winding 21 and wire 23 to point 24 which is the other output terminal of the switching circuit. Reactor winding 21 is wound on a core of reactor 22. It is at point 24 that the switching of the voltage polarity is accomplished.

The other half 15B is connected to point 24 through wire 25, resistor 26 and wire 27.

A control winding 28 is wound on the core of reactor 22 and connected to unidirectional current source of the polarity shown. The control signal current flowing from its source through the winding 28 will create a flux in reactor 22 to aid in its saturation.

The bias winding 31 is wound on the core of reactor 22 and is connected to a unidirectional current source of a polarity shown. The bias signal current flowing from its source through the bias winding 31 creates a flux opposed to that created by control winding 28 tending to maintain reactor 22 unsaturated.

For the circuit shown in FIGURE 1, the switching of the voltage polarity can only be accomplished in the half cycle that half 15A is positive. This is the switching half cycle and the other half cycle, when half 15A is negative, is the resetting half cycle.

In the switching half cycle, current will flow through wire 18, rectifier 19, wire 20, reactor winding 21 and wire 23 to point 24. From point 24, the current will flow back to half 15B by means of wire 27, resistor 26 and wire 25.

At the beginning of the switching half cycle, reactor 22 is at a predetermined level of flux as established by the current flowing through control winding 28 and bias winding 22. Assuming that the predetermined level of flux is below that required to saturate reactor 22, the impedance of winding 21 is high with respect to the impedance of resistor 26. This impedance ratio causes most of the voltage drop to occur across winding 21 and very little across resistor 26. Therefore, point 24 is at the same polarity as half 15B, which is negative with respect to center tap 16 during the switching half cycle.

The aforedescribed current flowing through winding 21 is in a direction to create a flux which assists the flux due to current in control winding 28 in saturating reactor 22. The time that this current flows before saturation of reactor 22 occurs, is dependent upon the level of flux saturation already existing due to the combined effect of the currents flowing in control winding 28 and bias winding 31.

When reactor 22 becomes saturated, the impedance of winding 21 is rapidly reduced to a low value with respect to the impedance of resistor 26. The voltage drop across winding 21 is reduced to a low value and that across resistor 26 is increased correspondingly. The polarity at point 24 is switched to substantially the same as that on half 15A, which is positive with respect to center tap 16.

The voltage at point 24 is, therefore, switched from a negative value to the opposite polarity or positive value, by the saturation of reactor 22. This is better illustrated in FIGURE 3 by the wave forms of the voltage. A solid voltage curve, curve A, represents the voltage across half 15A, starting when it is positive. Curve B is shown dotted and represents the voltage as it appears between point 24 and point 16.

As described, the voltage between point 24 and point 16 is negative when reactor 22 is unsaturated at the beginning of the switching half cycle. When it becomes saturated, this voltage changes its polarity very rapidly as shown by the straight line portion 34 of curve B. The voltage will continue to be positive during the remaining portion of the switching half cycle, as determined by the supply voltage from half 15A.

At the beginning of the next or resetting half cycle, the polarity at point 24 is switched back to substantially the same as that on half 15B. This is due to the fact that the polarity of secondary 15 reverses at the beginning of the next half cycle, making half 15B positive and half 15A negative with respect to center tap 16. Current cannot flow in the reverse direction through the aforedescribed current path because of the blocking action of rectifier 19. No current can flow through winding 21 and the polarity at point 24 cannot be switched. Therefore, the polarity at point 24 will remain positive throughout the entire resetting half cycle.

Since no current can flow through winding 21, only the current flowing in control winding 28 and bias winding 31 will create a flux in reactor 22. If the value of these currents have not changed, reactor 22 will be reset to the same level of flux as it was at the start of the previous switching half cycle.

When the next switching half cycle starts, making half 15A positive again, the voltage across point 24 and point 16 will remain negative due to the impedance of reactor winding 21 when reactor 22 is unsaturated. The flow of current through winding 21 will cause reactor 22 to become saturated again and the voltage polarity will be switched at the same instant in this switching half cycle.

The control current flowing through control winding 28 may be changed in value to change the instant in the switching half cycle at which reactor 22 saturates and the polarity of the voltage is switched. It does this by changing the level of flux to which reactor 22 is reset. The higher the value of the control signal current, the earlier in the switching half cycle reactor 22 will saturate and the polarity of the voltage will be switched. Conversely, when the current value of the control signal is reduced, reactor 22 will saturate to switch the polarity of the voltage later in the switching half cycle.

As before stated, it has been chosen to describe the switching circuit as a means of controlling the conduction of current through gas filled tubes. This will now be described with reference to FIGURE 2.

Two gas filled tubes of the thyratron type are shown at 35 and 36, each having a plate 37 and 38, a cathode 39 and 40, and a control grid 41 and 42, respectively. The tubes 35 and 36 are used to control the amount of direct current power supplied to a load 43 from the source of alternating current power 44.

The source of power 44 is connected by wires 45 and 46 to a primary winding 48 of a transformer 47.

Transformer 47 has a secondary 49 that has a center tap 50 which divides the secondary winding into two halves, 49A and 49B. Center tap 50 is connected by wire 51 to the negative side of the load 44.

Half 49A is connected by wire 52 to plate 37 of tube 35. Half 49B is connected by wire 53 to plate 38 of tube 36.

Cathode 39 of tube 35 is connected by wire 54, point 55, and wire 56 to load 44. Cathode 40 of tube 36 is connected by wire 57, point 55 and wire 56 to load 44.

In the half cycle when half 49A is positive and when tube 35 is conducting, current will flow through wire 52, tube 35 from plate 37 to cathode 39, wire 54, point 55, wire 56, load 44 and wire 51 to center tap 50 of secondary winding 49.

In the other half cycle, half 49B is positive and when tube 36 is conductive, current will flow through wire 53, tube 36 from plate 38 to cathode 40, wire 57, point 55, wire 56, load 44 and wire 51 to center tap 50 of secondary winding 49.

It has previously been stated how gas filled tubes can be made conductive by applying the proper voltage signal to their control grids. It has also been shown how the switching circuit in FIGURE 1 is able to switch or reverse the polarity of its voltage. Therefore, by connecting a switching circuit to each of the control grids and properly reversing the polarity of their voltage outputs, the conduction of the tube can be controlled, as will now be described.

Since the circuit shown by FIGURE 2 utilizes two switching circuits that are identical, in almost all respects, to that described per FIGURE 1, the same reference numerals will be used for the identical parts in one circuit. The identical parts of the second switching circuit will be indicated also by the same numeral but with the addition of the suffix A.

In practice, the source of power for the switching circuit may be the same source as that used to furnish power to the load and having a second secondary winding on transformer 47. For purposes of illustration and simplicity of description, I have chosen to show it as a separate source.

A modification to the circuit is made necessary by some practical operating characteristics of thyratron tubes, which is that, the phase of the voltage applied to the control grids should be advanced over the phase of the voltage applied to the plate-cathode circuit to preclude the possibility of accidentally mis-firing the tube at the beginning of the conducting half cycle. It is to be noted that this phase shift does not limit the range of overall control since a tube of this type must have a substantial anode starting voltage.

This is accomplished by connecting a symmetrical fixed inductor-resistor type phase shifting circuit in the switching circuit across the transformer secondary winding 15. It consists of a resistor 58, and inductor winding 59 and a resistor 60 connected in series between wires 18 and 18A. A wire 61 connects resistor 58 and inductor winding 59 and wire 62 connects inductor winding 59 and resistor 60. The wires 25 and 25A are then connected to wire 62 and 61, respectively.

As previously discussed, the conduction of current through a gas filled tube can be controlled by applying the proper voltage potential to its control grid. A negative voltage with respect to the potential on the cathode, will prevent the tube from starting the conduction of current, while a positive voltage will initiate the current flow through the tube. This can take place only in the half cycle during which the voltage on the plate is positive with respect to the cathode. During the other half cycle, the tube cannot conduct current because it is a unidirectional device regardless of the voltage applied to the control grid. Also, any current flow in the positive half cycle will automatically be extinguished at the start of the other half cycle.

Therefore, to apply the proper voltage on the control grids 41 and 42, point 24 is connected by wire 63 to control grid 41, point 24A is connected by wire 64 to control grid 42 and wire 17 is connected to point 55.

The voltages from source 10 and source 43 are connected to make half 15A of secondary winding 15 and half 49A of secondary winding 49 positive during the same half cycle. This half cycle will be a switching half cycle for the switching circuit utilizing reactor 22 and the resetting half cycle for the switching circuit utilizing reactor 22A.

Current will flow from half 15A through wire 18, resistor 58, wire 61, inductor winding 59, wire 62, resistor 60, and wire 18A to half 15B. The current flow through this circuit will cause the phase angle of the voltage from source 10 to be advanced in the well known manner. The amount that the phase angle is advanced is dependent upon the values of resistors 58 and 60 and reactor 59.

At the same time, current will flow through half 15A through the aforedescribed current path of wire 18, rectifier 19, wire 20, reactor winding 21, wire 23, point 24, wire 27, resistor 26, wire 25, resistor 60 and wire 18A to half 15B.

Control current will flow from its source through wire 29, control winding 28 on reactor 22, control winding 29A on reactor 22A and wire 30 back to the source.

Bias current will flow from its source through wire 32, bias winding 31 on reactor 22, bias winding 31A on reactor 22A and wire 33 back to the source.

The current flowing through control winding 28 and bias winding 31 will have already set the level of flux in reactor 22 during the preceding half cycle, which was its resetting half cycle. The same current flowing through control winding 28A and bias winding 31A will cause the flux level of reactor 22A to be reset to the same level during this, its resetting half cycle.

With reactor 22 unsaturated at the beginning of its switching half cycle, a large voltage drop exists across reactor winding 21 making the polarity at point 24 negative. Since point 24 is connected to control grid 41, this same negative potential appears on it. Therefore, with the polarity on control grid 41 negative with respect to the polarity on plate 37, the tube 35 is prevented from conducting current.

The current flow through winding 21 causes reactor 22 to become saturated after a period of time dependent upon the respective values at which the flux level was previously set. When reactor 22 saturates, the polarity of point 24 changes to a positive value as has been described. Since it is connected to control grid 41, the positive polarity also appears there.

When the voltage on control grid 41 changes from its negative polarity to the positive polarity, it intercepts the critical grid voltage characteristic of the tube, causing it to fire, and initiating the conduction of current through tube 35.

Current will then flow from half winding 49A through the aforedescribed current path when tube 35 is conductive. This current continues till the end of the cycle and then stops because plate 37 becomes negative and the tube cannot conduct in the reverse direction.

In the next half cycle, half 15B and half 49B become positive which will cause the circuit utilizing reactor 22A to function in a same manner as was described for the circuit utilizing reactor 22 in the first half cycle. This half cycle is the switching half cycle for the switching circuit utilizing reactor 22A and the resetting half cycle for the switching circuit utilizing reactor 22.

With half 15B positive, current will flow through wire 18A, rectifier 19A, wire 20A, reactor winding 21A, wire 23A, point 24A, wire 27A, resistor 26A, wire 25A, resistor 58 and wire 18 to half 15A.

At the same time, current will flow from half 15B through wire 18A, resistor 60, wire 62, inductor winding 59, wire 61, resistor 58, and wire 18 to half 15A. The current flow through this circuit causes the phase angle of the voltage from source 10 to be advanced in the same manner as previously mentioned.

With the same value of control current flowing through control winding 28A, reactor 22A will be unsaturated at the beginning of the cycle making point 24A of a negative polarity. Point 24A is connected to control grid 42 and thus impresses the negative polarity on it. Therefore, tube 36 will not begin conduction of current even though its plate 38 is now positive.

The current flowing through winding 21A will cause reactor 22A to saturate at the same time in its switching half cycle as reactor 22 did in its switching half cycle. When saturation of reactor 22A takes place, point 24A becomes positive as does control grid 42.

This change of polarity on control grid 42 causes a voltage to intercept the tube's critical grid voltage allowing tube 36 to fire and initiate the conduction of current through it.

Current can flow from half winding 49B through the aforedescribed current path when tube 36 is conductive.

Therefore, the load receives unidirectional current from alternate tubes during successive half cycles and the value of current that it receives is dependent upon the time in the respective switching half cycles that the reactors 22 and 22A saturate. And as before stated, the time that reactor 22 and 22A saturate can be controlled by changing the value of current flowing through control windings 28 and 28A.

This system lends itself very readily to complicated systems where the use of more than one control signal is required. In such cases, one winding is wound on the reactor for each control signal used; thereby, keeping them electrically isolated from each other, the grid switching circuit and the load circuit.

Although I have described my invention with a certain degree of particularity, it is understood that the above disclosure has been made only by way of example as required by law and that many changes in the details of circuitry may be resorted to by those skilled in the art without departing from the spirit and scope of my invention as hereinafter claimed.

I claim as my invention:

1. A polarity switching circuit comprising; a source of alternating current power, a unidirectional conducting device, a winding connected to the other side of the source, an impedance device connected to the other side of the source, a reactor having said winding wound thereon; said unidirectional conducting device connected in series with the source and said winding to allow current to flow only in the direction of said winding; said winding and impedance device connected to point; means for maintaining said reactor unsaturated whereby the polarity of said point is substantially the same as said other side of the source, and current flowing through said winding causes said reactor to become saturated whereby the polarity of said point is switched to substantially the same polarity as said one side of the source.

2. A circuit for switching the polarity of a voltage at any preselected instant during like polarity half cycles of an alternating source comprising; a serially connected winding and unidirectional conducting device connected on one side to one side of the source and to a point on the other, said unidirectional conducting device connected to permit flow of current only in the direction of said winding; a reactor having said winding wound thereon; an impedance device connected between said point and the other side of the source; means in the other half cycles to cause said reactor to become unsaturated whereby the polarity of said point is substantially the same as said other side of the source at the beginning of said half cycles, and current flowing through said winding causes the reactor to become saturated during said half cycles whereby the polarity of said point is switched to substantially the same polarity as said one side of the source.

3. A circuit for switching the polarity of a voltage at any preselected instant during like polarity half cycles of an alternating source comprising; a serially connected winding and unidirectional conducting device connected between one side of the source and a point, said unidirectional conducting device connected to permit flow of current through said winding only in the switching half cycles when the one side of the source is positive; a reactor having said winding wound thereon; an impedance device connected between said point and the other side of the source; additional windings on said reactor to cause it to be unsaturated at the beginning of the switching half cycles whereby the polarity at said point is substantially the same as the other side of the source, and the flow of current through said winding causes the reactor to become saturated to switch the polarity of said point to substantially the same polarity as said one side of the source.

4. A circuit for switching the polarity of a voltage at any preselected instant during like polarity half cycles of an alternating source comprising; a center tap for the source; a serially connected winding and unidirectional conducting device connected between one side of the source and a point, said unidirectional conducting device connected to permit flow of current through said winding only in the swithing half cycles when the one side of the source is positive; a reactor having said winding wound thereon; an impedance device connected between said point and the other side of the source; an additional winding on said reactor to cause it to be unsaturated at the beginning of the switching half cycles whereby the polarity at said point with respect to said center tap is negative, and the flow of current through said winding causes the reactor to become saturated to switch the polarity at said point to a positive value with respect to said center tap.

5. A polarity switching circuit comprising; a transformer having a primary and a secondary winding, a source for energizing the primary winding, a center tap on the secondary winding, a unidirectional conducting device, a winding connected to one side of the secondary winding, an impedance device connected to the other side of the secondary winding; a reactor having said winding wound thereon; said unidirectional conducting device connected in series with the secodary winding and said winding to allow current flow only in the direction of said winding; said winding and impedance device connected to a point; means for maintaining said reactor unsaturated whereby the polarity of said point is substantially the same as said other side of the secondary winding, and current flowing through said winding causes said reactor to become saturated whereby the polarity of said point is switched to substantially the same polarity as said one side of the secondary winding.

6. A polarity switching circuit comprising; a source of alternating current power with a center tap thereon, a unidirectional conducting device, a winding connected to one side of the source, an impedance device connected to the other side of the source, a reactor having said winding wound thereon; said unidirectional conducting device connected in series with the source and said winding to allow current flow only in the direction of said winding; said winding and said impedance device connected to a point; means for maintaining said reactor unsaturated during a portion of the half cycle when said one side of the source is positive whereby the polarity of said point is substantially the same as said other side of the source, and current flowing through said winding causes said reactor to become saturated whereby the polarity of said point is switched to substantially the same polarity as said one side of the source for the remaining portion of said half cycle.

7. A polarity switching circuit comprising; a source of alternating current with a center tap thereon, a first and second unidirectional conducting device, a first winding connected to one side of the source, a second winding connected to the other side of the source, a first and second reactor having said first and second windings wound thereon respectively, a first impedance device connected to said other side of the source, a second impedance device connected to said one side of the source; the first unidirectional conducting device connected in series with said one side of the source and the first winding to permit current flow only in the direction of the first winding; the second unidirectional conducting device connected in series with said other side of the source and the second winding to permit current flow only in the direction of the second winding; the first winding and first impedance device connected to a first point; the second winding and second impedance device connected to a second point; means for maintaining both reactors unsaturated whereby the polarity at both the first and second points is negative, and the current flowing through said first and second windings causes their associated reactors to become saturated in alternate half cycles whereby the point associated with the saturated reactor is switched from the negative polarity to a positive polarity.

8. An excitation circuit for controlling the current conduction through a grid controlled rectifying device comprising; a voltage source, a winding connected to one side of the source, an impedance device connected to the other side of the source, a reactor having said winding wound thereon; said winding and impedance device connected to the grid of said rectifying device, means to maintain said reactor unsaturated whereby the grid is maintained at a polarity substantially the same as said other side of the source preventing said rectifying device from conducting current, and current flowing through said winding saturate said reactor whereby the polarity on the grid is switched to substantially the same polarity as said one side of the source allowing the conduction of current through said rectifying device.

9. In an excitation circuit for energizing a grid of a gas filled tube to repetitively fire said tube at any preselected instant during like polarity half cycles of an alternating current source, a winding connected to one side of the source, a unidirectional conducting device connected in series with the source and said winding to permit current flow only in the direction of said winding, a reactor having said winding wound thereon, an impedance device connected to the other side of the source, said winding and said impedance device connected to the grid; and means to maintain the reactor unsaturated whereby the grid is energized by the polarity of said other side of the source, and current flowing through said winding causes the reactor to become saturated and energize the grid by the polarity of said one side of the source to fire the tube.

10. The excitation circuit as described in claim 9 where the means is variable to change the instant in the said half cycles that the reactor is saturated and the tube is fired.

11. In an excitation circuit for energizing a grid of a gas filled tube to repetitively fire said tube at any preselected instant during like polarity half cycles of an alternating current source; a unidirectional conducting device and a winding connected in series to one side of the source and arranged to permit flow of current only in the direction of said winding; a reactor having said winding wound thereon; an impedance device connected to the other side of the source; said winding and said impedance device connected to the grid; means to cause said reactor to become unsaturated during the other half cycles of like polarity whereby the grid is energized by the polarity of said other side of the source at the beginning of the like polarity half cycles, and current flowing through said winding causes the reactor to become saturated during said like polarity half cycles and energize the grid by the polarity of said one side of the source to fire the tube.

12. The excitation circuit as described in claim 11 where said means is variable to change the instant in the half cycle of like polarity that the reactor is saturated and the tube is fired.

13. In an excitation circuit for energizing a grid of a gas filled tube to repetitively fire said tube at any preselected instant during like polarity half cycles of an alternating source; a serially connected winding and unidirectional conducting device connected between one side of the source and the grid, said unidirectional conducting device connected to permit flow of current through said winding only in the switching half cycles when the one side of the source is positive; a reactor having said winding wound thereon; an impedance device connected between the other side of the source and the grid; additional windings on said reactor to cause it to be unsaturated at the beginning of the switching half cycle and energize the grid with a negative polarity, and the flow of current through said winding causes said reactor to become saturated to switch the polarity on the grid to a positive value to fire the tube.

14. In a circuit for controlling the power conducted to a load comprising; a gas filled tube having a plate, cathode, and conduction controlling grid; a first source of power connected in series with the load and the plate-cathode circuit of the tube; a second source of power; a winding connected to one side of the second source; a unidirectional conducting device connected in series with said winding and the one side of the second source to allow current flow only in the direction of said winding; an impedance device connected to the other side of the second source; said winding and impedance device connected to said controlling grid, a reactor having said winding wound thereon; means for maintaining said reactor unsaturated whereby said controlling grid is energized by a polarity to prevent the tube from firing and current flowing through said winding causes said reactor to become saturated whereby said controlling grid is energized with a polarity to cause the tube to fire and conduct power from the first source to the load.

15. In a circuit for controlling the power conducted to a load during like half cycles comprising; a gas filled tube having a plate, cathode and conduction controlling grid; a first alternating source connected in series with the load and the plate-cathode circuit of the tube; a second alternating source; a serially connected winding and a unidirectional conducting device connected between one side of the second source and the grid; said unidirectional conducting device connected to permit current flow through said winding only when the one side of the second source is positive; a reactor having said winding wound thereon; an impedance device connected between the grid and the other side of the second source, additional winding means associated with said reactor to cause it to be unsaturated at the beginning of said half cycles and energize the grid with a negative polarity, and the flow of current through said winding causes the reactor to become saturated to switch the polarity energizing the grid to a positive valve to cause it to fire and conduct power from the first source through the tube to the load.

16. A circuit for controlling the power conducted to a load during like half cycles as described in claim 14 wherein the second source has a center tap which is connected to the cathode of the tube.

17. The switching circuit as described in claim 2 where the means is variable to change the instant during said half cycle the reactor becomes saturated and switches the polarity of said point.

18. A circuit for switching the polarity of a voltage at any preselected instant during like polarity half cycles of an alternating source comprising; a reactor; a first winding on said reactor serially connected with a unidirectional conducting device between one side of the source and a point; an impedance device connected between said point and the other side of the source; a second winding on said reactor energized to establish a level of flux in the reactor so at the beginning of the switching half cycle the polarity of said point is substantially the same as the other side of the source, and the flow of current through said first winding creates additional flux in the reactor to saturate it to cause the polarity of said point to be switched to substantially the same polarity as said one side of the source.

19. A switching circuit as described in claim 18 and in which the energization of the second winding may be varied to change the instant in the switching half cycle that the reactor is saturated and the polarity of the point is switched.

20. A polarity switching circuit comprising, a source of alternating current with a center tap; a first reactor having a first and second winding thereon; a second reactor having a third and fourth winding thereon; a first and second undirectional conducting device; the first winding serially connected with the first unidirectional conducting device between one side of the source and a first point to allow current flow through the first winding only in one half cycle; the third winding serially connected with the second undirectional device between the other side of the source and a second point to allow current flow through the third winding only in the other half cycle; a first impedance means connected between the first point and the other side of the source; a second impedance means connected between the second point and the one side of the source; the second and fourth winding connected in series and energized to establish a level of flux in the first and second reactors, whereby during the one half cycle current flows through the first winding to saturate the first reactor and cause the polarity of the first point to be switched from that of the other side of the source to that of the one side of the source and during the other half cycle current flows through the third winding to saturate the second reactor and cause the polarity of the second point to be switched from that of the one side of the source to that of the other side of the source.

References Cited in the file of this patent

UNITED STATES PATENTS

| | | |
|---|---|---|
| 2,248,600 | Alexanderson | July 8, 1941 |
| 2,408,091 | Olesen | Sept. 24, 1946 |
| 2,880,374 | Mulder | Mar. 31, 1959 |